United States Patent [19]
Engel et al.

[11] 3,911,322
[45] Oct. 7, 1975

[54] METHOD AND CIRCUIT ARRANGEMENT FOR AN IMPROVED LOW COST LIGHTNING ARRESTER

[75] Inventors: Joseph C. Engel, Monroeville, Pa.; Joseph L. Winpisinger, Rocky River, Ohio

[73] Assignee: Westinghouse Electric Corporation, Pittsburgh, Pa.

[22] Filed: Mar. 5, 1974

[21] Appl. No.: 448,311

[52] U.S. Cl. .................. 317/16; 317/31; 317/61.5; 317/50
[51] Int. Cl.$^2$ ......................................... H02H 3/22
[58] Field of Search ............. 317/16, 31, 50, 49, 61, 317/61.5, 62; 315/DIG. 5, 58, 200; 313/DIG. 5; 307/202

[56] References Cited
UNITED STATES PATENTS
3,641,394   2/1972   Hirose et al. .................. 317/61.5 X Primary Examiner—J. D. Miller
Assistant Examiner—Patrick R. Salce
Attorney, Agent, or Firm—R. A. Stoltz

[57] ABSTRACT

A method and circuit arrangement for lightning protection of electrical equipment utilizing a valve-type lightning arrester in which an additional accessible electrical terminal has been provided. An arrester comprising a resistive element connected in series with a spark gap, is to be connected across the power source and an additional accessible terminal is connected to the junction between the resistor and the spark gap. At least part of the electrical equipment is connected in parallel with the spark gap only, rather than in parallel with the entire arrester. This arrangement provides increased protection in that equipment connected directly across the spark gap is not subjected to the lightning surge follow voltage which is produced across the resistive element by the lightning surge follow current. The arrangement is especially useful for protecting solid state devices which are not damaged by the initial voltage spike but would be damaged by the energy transferred to them by the relatively long follow voltage.

2 Claims, 6 Drawing Figures

METHOD AND CIRCUIT ARRANGEMENT FOR AN IMPROVED LOW COST LIGHTNING ARRESTER

BACKGROUND OF THE INVENTION

One variety of valve-type lightning arrester consists of a series arrangement of a resistive element and a spark gap. This commonly used type lightning arrester has only two terminals and is connected across the power source in parallel with the load. While this type of lightning arrester is inexpensive, it subjects the load both to the initial voltage spike produced by a lightning surge and to the lightning surge follow voltage which develops across the resistive element of the lightning arrester due to the relatively long lightning surge follow current. The voltage characteristic versus time of a typical valve type lightning arrester is shown on page 335 of *Surge Phenomena — Seven Years Research For the Central Electricity Board*, the British Electrical and Allied Industries Research Association, London, (1941).

Although the resistance of the resistive elements in such lightning arresters is relatively small, for example 0.05 ohm, the very high follow currents through a lightning arrester produce relatively high voltage across the terminals of the arrester and therefore conventionally produce relatively high currents into the load. The follow voltage typically lasts for several milliseconds while the initial voltage spike typically lasts only a fraction of a millisecond. As a result, when a conventional arrester is used the energy to the load is generally much higher during the follow voltage period than during the initial voltage spike.

The circuit arrangement proposed on page 353 of *The Protection of Transmission Systems against Lightning* by W. W. Lewis (Wylie 1950), uses a reactor in series with the load on the line side of the arrester. Such an arrangement is expensive and while it is applicable to protect some types of equipment as it lessens the maximum voltage to the load by limiting the initial voltage spike, it is not as applicable to protect semiconductors, for example, as the energy transferred to the load, during the follow voltage period is not significantly reduced.

SUMMARY OF THE INVENTION

This invention relates to a method and circuit arrangement for lightning protection of electrical equipment using a valve-type lightning arrester.

This invention provides lightning protection for electrical equipment and utilizes a valve-type lightning arrester with three accessible electrical terminals, where a resistive element is connected between the first terminal and the second terminal and a structure comprising a pair of electrodes closely spaced to provide a spark gap is connected between the second terminal and the third terminal. The first terminal and the third terminal are to be connected to the power source and at least part of the electrical equipment is connected between the second terminal and the third terminal. The circuit arrangement is especially useful for the protection solid state controlled lighting equipment such as photoelectrically-controlled street lighting equipment.

BRIEF DESCRIPTION OF THE DRAWINGS

For a better understanding of the invention, reference may be had to the accompanying drawings in which.

DESCRIPTION OF THE PREFERRED EMBODIMENTS

Figure 1:
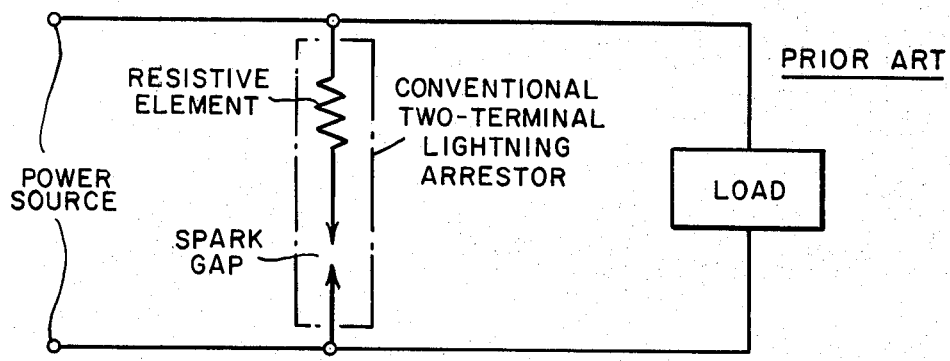
FIG. 1 is a diagram illustrating a conventional circuit arrangement using a two-terminal lightning arrester connected to a power source in parallel with a load.
Figure 2:
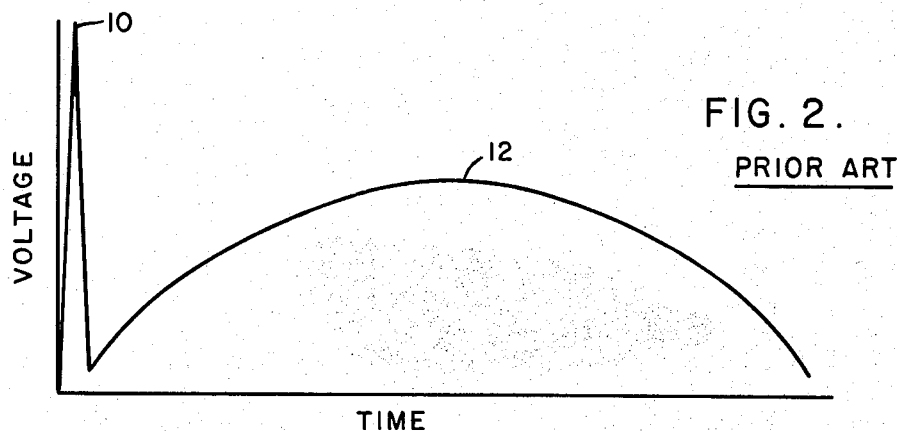
FIG. 2 shows lightning induced voltage across the terminals of a conventional two-terminal arrester versus time.

For a better understanding of the invention, it is convenient to examine the operation of a conventional (two-terminal) valve-type arrester as shown in FIG. 1 and the voltage which will appear across its terminal (and across the load) during a "typical" lightning surge as shown in FIG. 2. The initial voltage spike 10 typically lasts only a fraction of a microsecond. There is little current across the spark gap during this time and the voltage drop across the resistive element is not significant. After the initial voltage spike, however, the current through the resistive element and across the spark gap rises and the voltage at the terminals of this conventional arrester is the relatively low voltage across the now ionized spark gap plus the relatively high voltage across the resistive element due to the very high follow current (the voltage from the power source is relatively low, and can, for purposes of analyzing energy transferred to the load, be ignored). Even though the voltage of the initial voltage spike is typically much higher than the follow voltage 12, more energy is transmitted to the load during the follow voltage period than during the spike because of the much longer duration of the follow voltage 12.

Figure 3:
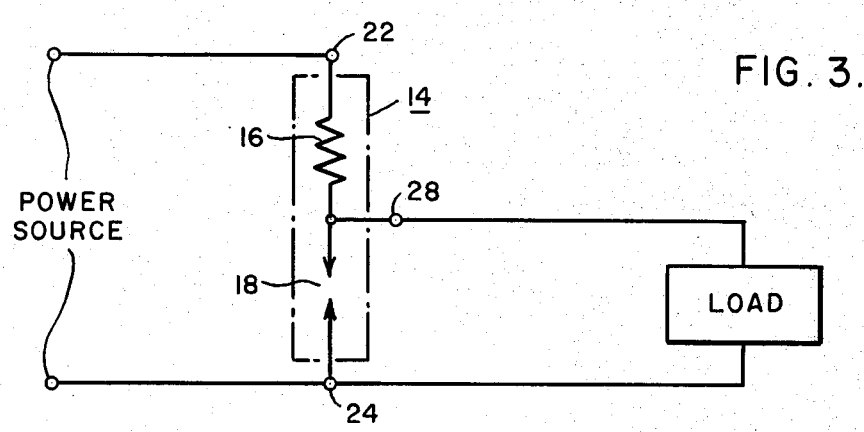
FIG. 3, which is exemplary of the invention, shows the circuit arrangement utilizing a three-terminal lightning arrester.
Figure 4:
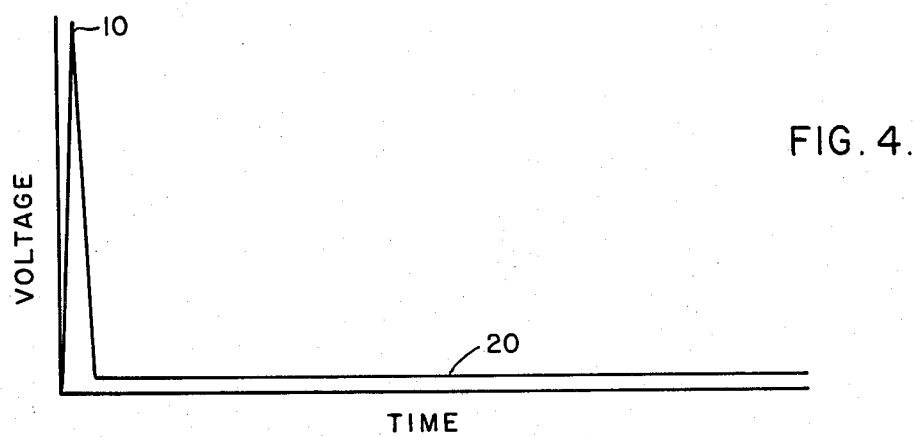
FIG. 4 shows the lightning induced voltage across terminals 2 and 3 of the three-terminal lightning versus time.

In the improved arrangement shown in FIG. 3 the lightning arrester 14 also has a resistive element 16 and a spark gap 18, but the common point between the resistive element 16 and the spark gap 18 is made accessible and the load is connected in parallel with the spark gap 18 only. FIG. 4 shows the voltage to which this load connected across the spark gap 18 would be subjected during the aforementioned "typical" lightning surge. The voltage to the load during initial voltage spike 10 would be essentially the same but the total energy to the load will be greatly reduced as the load will not see the follow voltage 12 developed by the follow current across the resistive element 16, but will only see the relatively low voltage across the spark gap 20. Thus the voltage on the line side of the lightning arrester 14 (between the first terminal 22 and the third terminal 24) will be the same as shown in FIG. 2, but the load in FIG. 3 will be subjected only to the voltage as shown in FIG. 4.

It has been found that many circuit components, especially semiconductors, are able to withstand high voltage spikes of microsecond duration but unable to withstand somewhat lower voltages of millisecond duration. It can be seen that the improved arrangement provides better protection for such elements than the conventional arrangement.

Figure 5:
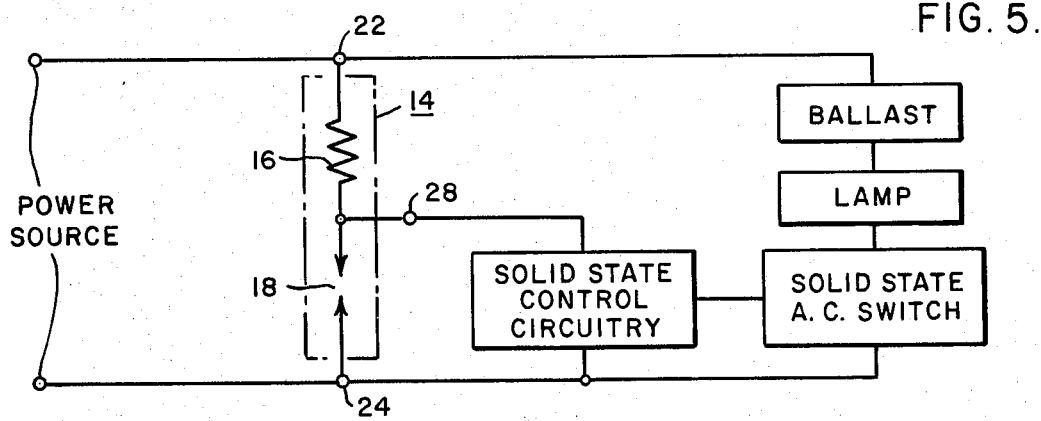
FIG. 5 shows an embodiment of the invention in which the three-terminal lightning arrester is used both to provide conventional protection for a ballast, a lamp, and a solid AC switch, and to provide improved protection for solid state control circuitry.

FIG. 5 illustrates an alternative arrangement in which a portion of the load receives the improved protection while the remainder of the load is protected in the conventional manner. Here, during normal operation of the lamp, there is no significant additional loss as compared to a conventional arrangement as the lamp current does not flow through the resistive element 16. The current of the solid state control circuitry which flows through the resistive element 16 of the lightning arrester 14 during normal operation is very low and the loss is minimal.

Figure 6:
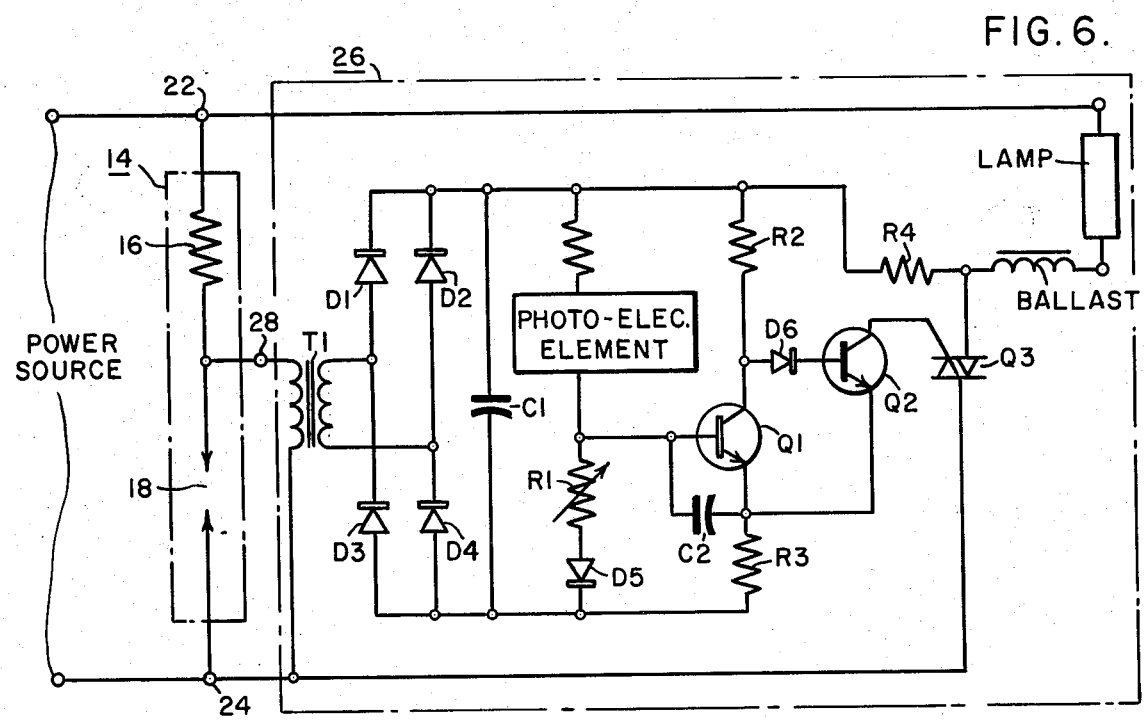
FIG. 6 shows a circuit arrangement in which a solid state photoelectric control is shown in more detail.

FIG. 6 illustrates a specific embodiment in which the photoelectric control circuit 26 for street lights receives the improved protection. Such control circuits are known as in the art. The operation of such a photoelectric control circuit 26 is described in U.S. Pat. No. 3,590,316, dated June 29, 1971.

All of the electrical equipment may be connected between the second terminal 28 and the third terminal 24 of the lightning arrester 14 as the resistance of the resistive element 16 is small, typically 0.01 ohms to 0.5 ohms, and losses are not prohibitive even if full load current pass through it. Such an arrangement could be used, for example, when the lighting equipment comprises photoelectrically-controlled outdoor lighting equipment and a 0.05 ohm resistive element 16 would only add a ¼ watt loss to a 5 amp lamp.

Alternately, as noted in the descriptions of FIGS. 5 and 6, it is possible to place only a portion of the load between the second terminal 28 and the third terminal 24. In such an arrangement the part of the equipment which is connected between the second terminal 28 and the third terminal 24 could comprise solid state control circuitry and the remainder of the electrical equipment, such as a lamp can be connected between the first terminal 22 and the third terminal 24. In such an arrangement the lamp is preferably a discharge lamp, and the remainder of the lighting equipment which is connected between the first terminal 22 and the third terminal 24 comprises a ballast, the discharge lamp, and the power terminals of the solid state AC switch in series connection, one of the power terminals of the solid state switch being connected to the third terminal 24. The control lead of the solid state AC switch is connected to the solid state control circuitry.

Although arrangements using three-terminal arresters are especially useful when a discharge lamp is used for outdoor lighting and the solid state control circuitry includes a photoelectric element to implement automatically controlling the discharge lamp, it is readily apparent that the circuit arrangement described herein can be used for other electrical equipment, and is especially useful for solid state controlled electrical equipment such as solid state transistorized ballasts or phase-controlled quadmaster ballasts.

It is preferable that the third terminal 24 be connected to the neutral of the power source as this tends to lower voltages between circuit components and grounded members during lightning surges.

We claim:

1. An improved circuit arrangement utilizing a lightning arrester for lightning protection of electrical lamp equipment, said circuit arrangement comprising:
   a. first, second and third accessible electrical terminals provided on said lightning arrester, said lightning arrester having as electrical components a resistive element connected between said first terminal and said second terminal and a structure comprising electrodes spaced to provide a spark gap connected between said second terminal and said third terminal and said first terminal and said third terminal being adapted to be connected to the power source;
   b. solid state lamp control circuitry connected between said second and third terminals; and
   c. said lamp is connected between said first terminal and said third terminal.

2. The circuit arrangement as specified in claim 1, wherein said third terminal is connected to the neutral of said power source.

* * * * *